J. T. THORNTON,
Assignor to THE AULTMAN & TAYLOR COMPANY.
Threshing Machine.
No. 9,264. Reissued June 22, 1880.
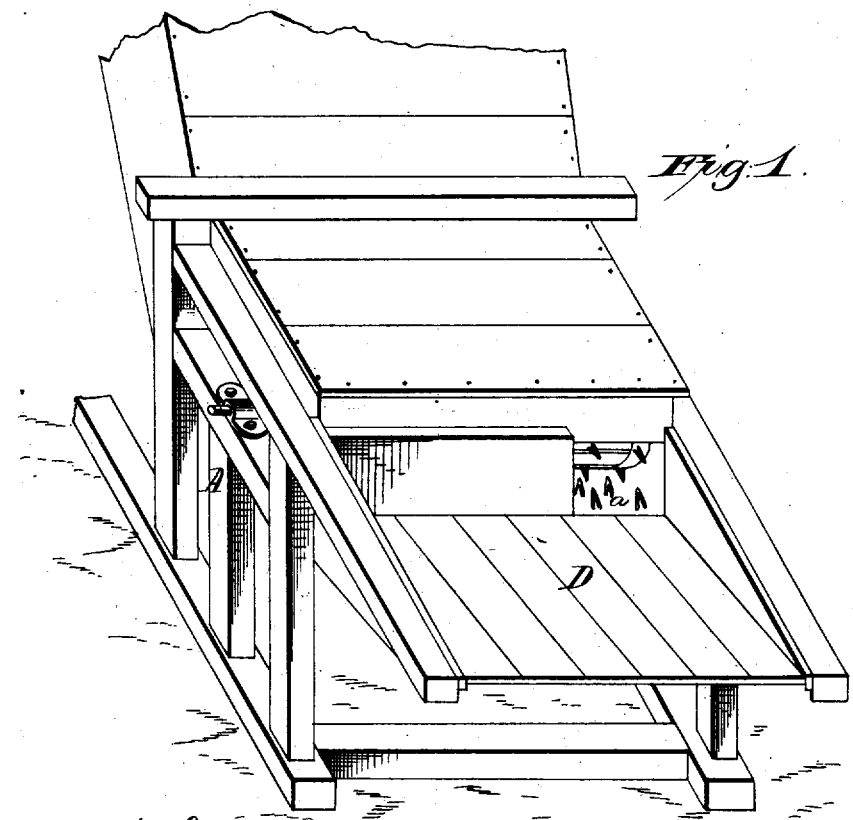
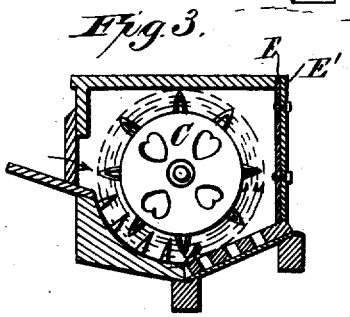
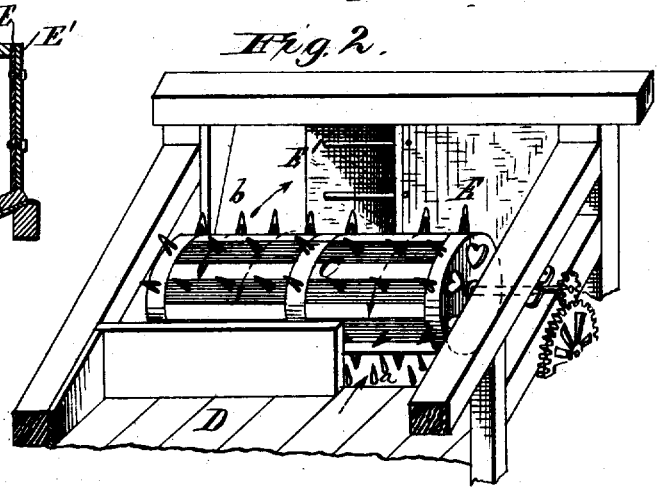
Witnesses.
Franck L. Ouraud
Alex Mahon
Inventor.
John T. Thornton,
by A. M. Smith
Atty
N. PETERS, PHOTO-LITHOGRAPHER, WASHINGTON, D. C.

UNITED STATES PATENT OFFICE.

JOHN T. THORNTON, OF FARRAGUT, IOWA, ASSIGNOR TO THE AULTMAN AND TAYLOR COMPANY, OF MANSFIELD, OHIO.

THRASHING-MACHINE.

SPECIFICATION forming part of Reissued Letters Patent No. 9,264, dated June 22, 1880.

Original No. 85,974, dated January 19, 1869; antedated January 6, 1869. Application for reissue filed May 24, 1880.

*To all whom it may concern:*

Be it known that I, JOHN T. THORNTON, formerly of Elmira, county of Stark, State of Illinois, but now of Farragut, county of Fremont, State of Iowa, have invented certain new and useful Improvements in Thrashing-Machines, of which the following is a full, clear, and exact description, reference being had to the accompanying drawings, making part of this specification, in which—

Figure 1 is a perspective view of a thrashing-machine with my improvements applied. Fig. 2 is a perspective view of a portion of the same with the cylinder-cover removed to show the cylinder, &c.; and Fig. 3 represents a vertical section through the cylinder concave, &c.

Similar letters of reference denote corresponding parts wherever used.

My invention relates to a novel construction of thrashing-machine, whereby it is adapted to be used for the thrashing and hulling of clover-seed; and it consists in the combination, with the cylinder concave, of an adjustable tail-piece or concave, extension, by the adjustment of which the material operated upon can be held up to the action of the cylinder for a longer or shorter period, as may be necessary, before it is allowed to escape, thereby adapting a machine constructed for thrashing grain to be used also for thrashing and hulling clover-seed, as hereinafter described.

The frame of the machine and the cylinder and fixed concave may be of any usual or preferred form and arrangement, similar to such as are in common use, and need not, therefore, be particularly described, as the invention relates only to the means for holding the material up to the action of the cylinder as long as may be necessary beyond what would be done by the usual concave alone, as hereinafter explained.

In the accompanying drawings, A represents the frame of the machine; B, the fixed concave; C, the cylinder, and D the feed-table over which the material to be operated upon is fed to the cylinder.

The opening through which the grain or clover to be thrashed is fed to the cylinder, in the construction shown, is arranged at one end, in front of the cylinder at *a*, and the discharge-outlet *b* at the opposite end and in rear of said cylinder, the design being to cause the grain or clover, as it is operated upon by the cylinder, to be moved laterally until it reaches and escapes through said discharge outlet or opening.

At the rear end of the fixed concave C is a wall or concave extension, E, rising in rear of the cylinder, and covering about one-half of the rear face thereof, closing a corresponding portion of the space or opening usually left for the escape of the grain after it has been acted upon by the cylinder, and to this is secured a slotted slide-extension or tail-piece, E′, which can be moved out over the discharge-opening *b*, at one end of the wall or concave extension E, for further contracting said opening, as may be necessary for reducing the size of the discharge-outlet and extending the surface for holding the material up to the action of the cylinder, and over which the material operated upon is required to pass before it can escape from the action of the cylinder.

By this arrangement it will be seen that the surface holding the material up to the action of the cylinder can be increased or extended to such an extent as to leave the discharge-outlet reduced to the smallest possible size consistent with provision for the final escape of the material acted upon by the cylinder, and as far removed from the feed-opening as may be, and yet be upon the opposite side and in rear of the cylinder, a feature of arrangement which has been found, in practice, to adapt an ordinary machine for thrashing grain to be readily changed, by adjustment of its parts, into a simple and exceedingly effective machine for thrashing clover and grass seed.

Having now described my invention, I claim—

1. In a thrashing-machine, the combination, with the cylinder and concave, of an adjustable tail-piece or concave extension, adapting said machine to be used for thrashing and hulling clover-seed.

2. In a thrashing-machine, the cylinder and concave, having the feed and discharge openings arranged at their opposite ends and upon opposite sides of the cylinder, as described, in combination with means for adjusting the size of the discharge-outlet and extending the surface holding the material operated upon up to the action of the cylinder, substantially as described.

JOHN T. THORNTON.

Witnesses:
C. S. HANLEY,
JNO. C. JONES.